(12) United States Patent
Sotobayashi et al.

(10) Patent No.: US 12,708,999 B2
(45) Date of Patent: Aug. 18, 2026

(54) ROBOT AND METHOD FOR MANUFACTURING ROBOT

(71) Applicant: KABUSHIKI KAISHA YASKAWA DENKI, Fukuoka (JP)

(72) Inventors: Kyoko Sotobayashi, Fukuoka (JP); Takeyuki Ninomiya, Fukuoka (JP); Kenki Mochizuki, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 22 days.

(21) Appl. No.: 18/951,958

(22) Filed: Nov. 19, 2024

(65) Prior Publication Data

US 2025/0162137 A1 May 22, 2025

(30) Foreign Application Priority Data

Nov. 22, 2023 (JP) ................................ 2023-198689

(51) Int. Cl.
*B25J 18/04* (2006.01)
*B25J 9/10* (2006.01)

(52) U.S. Cl.
CPC ............... *B25J 9/102* (2013.01); *B25J 18/04* (2013.01)

(58) Field of Classification Search
CPC ................................ B25J 9/102; B25J 18/04
See application file for complete search history.

(56) References Cited

U.S. PATENT DOCUMENTS 8,210,069 B2 * 7/2012 Chen .................... B25J 17/0258 901/29
2005/0221941 A1 * 10/2005 Nihei ........................ F16H 1/32 475/178
2006/0170384 A1 8/2006 Kumagai et al.
(Continued)

FOREIGN PATENT DOCUMENTS

JP 202194612 A 6/2021
WO 2023188088 A1 10/2023

OTHER PUBLICATIONS

Office Action issued in counterpart European Patent Application No. 24210303.4 mailed Jul. 24, 2025 (5 pages).
(Continued)

*Primary Examiner* — Gregory Robert Weber
(74) *Attorney, Agent, or Firm* — Osha Bergman Watanabe & Burton LLP

(57) ABSTRACT

Object
To provide a robot and a method for manufacturing the robot with which downsizing of an arm is possible.
Solution to Problem
A robot 1 includes a lower arm portion 9, an elbow portion 11 rotatably coupled to the lower arm portion 9, a motor 23 housed in the lower arm portion 9 and including a motor shaft 31 rotating around a motor axial center AxM, a first gear 33 coupled to the motor shaft 31 and rotating around the motor axial center AxM, a second gear 37 rotating, in conjunction with the first gear 33, around a gear axial center AxG intersecting the motor axial center AxM, and a decelerator 27 configured to decelerate rotation of an input shaft 47 and transmit the decelerated rotation to an output shaft 51, the decelerator including the input shaft 47 configured to rotate, in conjunction with the second gear 37, around a
(Continued)

decelerator axial center AxR coinciding with the gear axial center AxG, and the output shaft 51 coupled to the elbow portion 11.

6 Claims, 6 Drawing Sheets

(56) References Cited

U.S. PATENT DOCUMENTS

| | | | | |
|---|---|---|---|---|
| 2019/0134810 | A1 | 5/2019 | Goto et al. | |
| 2021/0178573 | A1 | 6/2021 | Yoneda | |
| 2025/0153347 | A1 * | 5/2025 | Amemiya | B25J 17/00 |

OTHER PUBLICATIONS

Extended European Search Report issued in corresponding Euorpean Patent Application No. 24210303.4, mailed Feb. 20, 2025 (12 pages).

* cited by examiner

[FIG. 1]
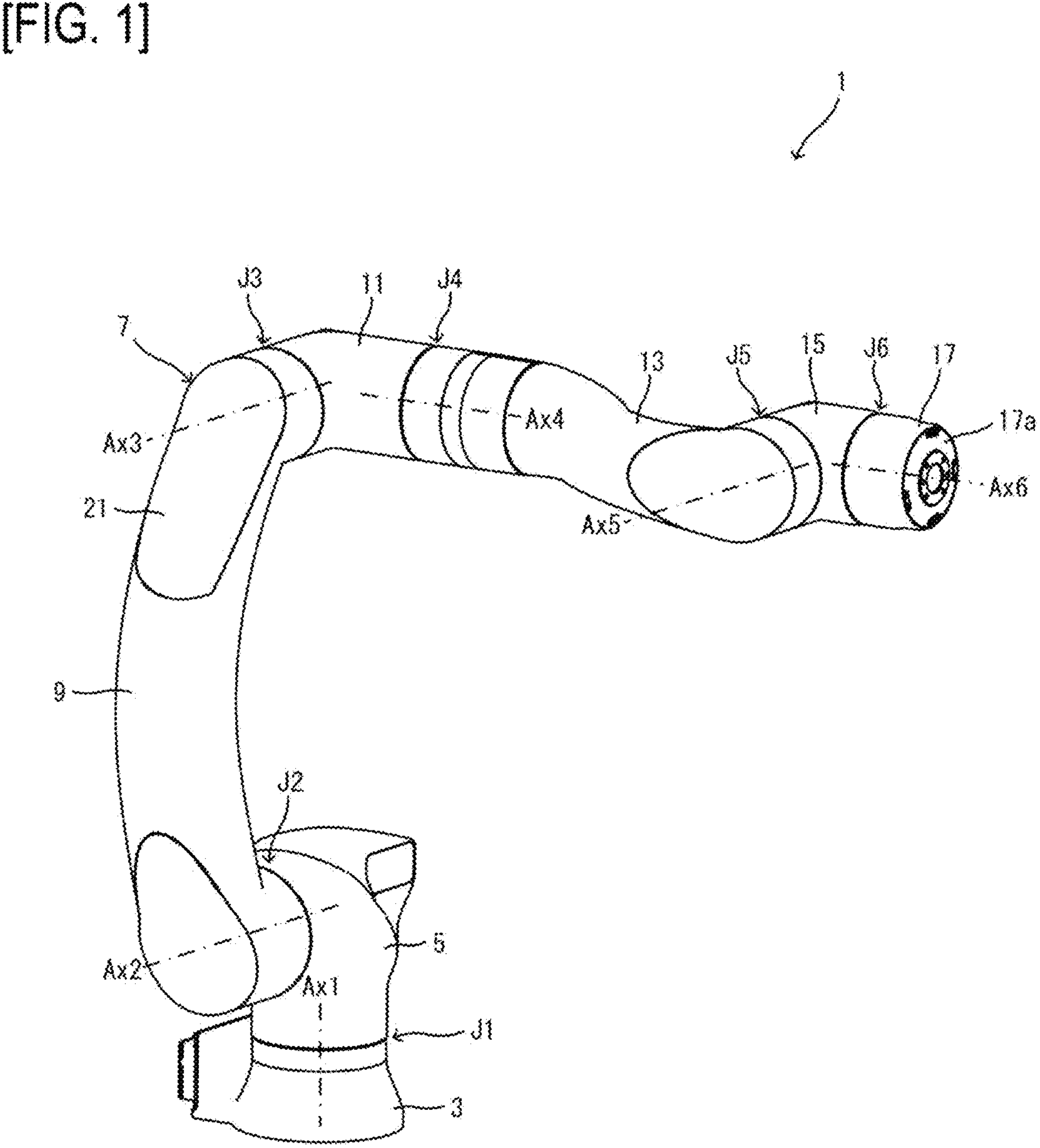

[FIG. 2]
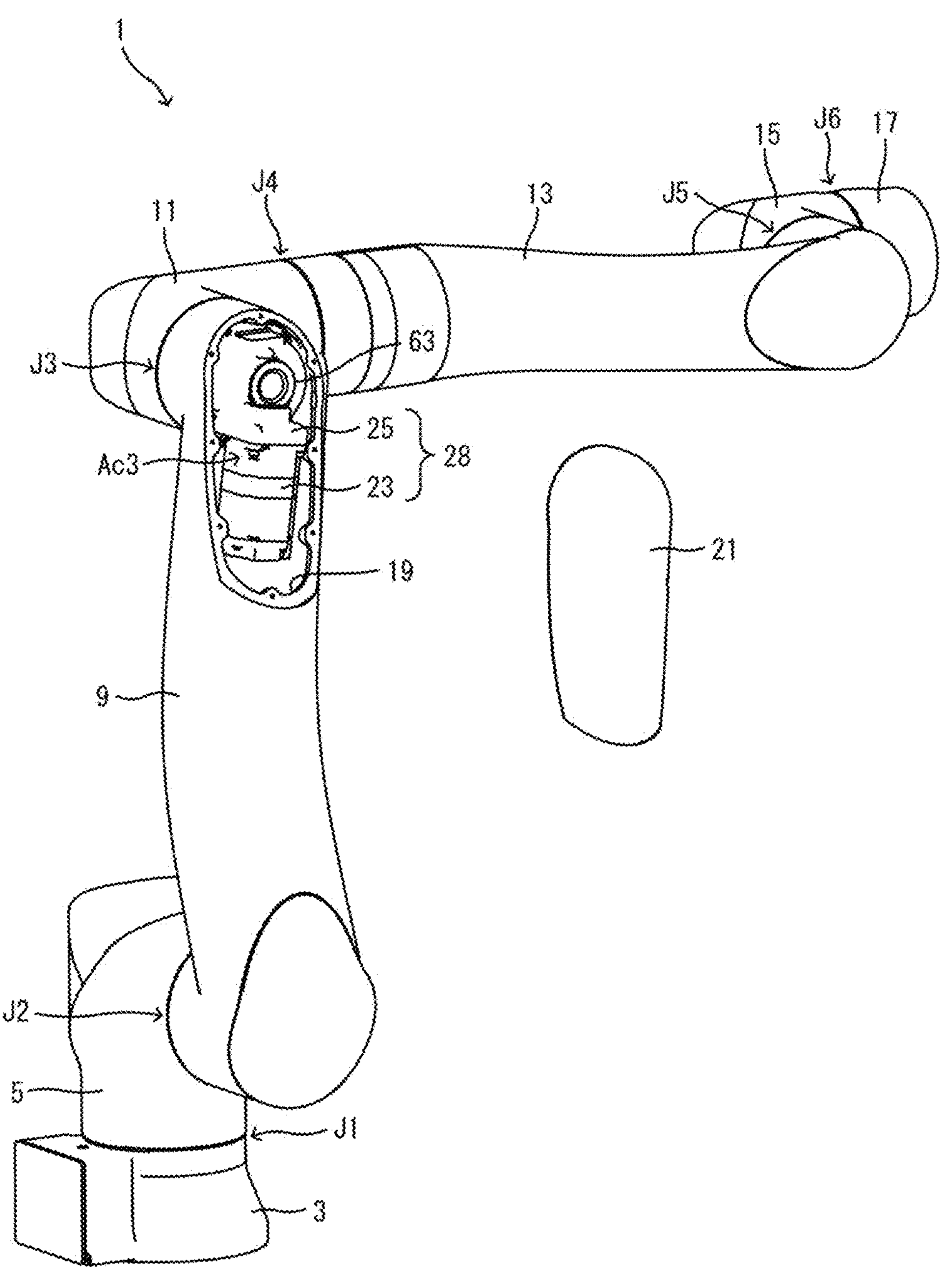

[FIG. 3]
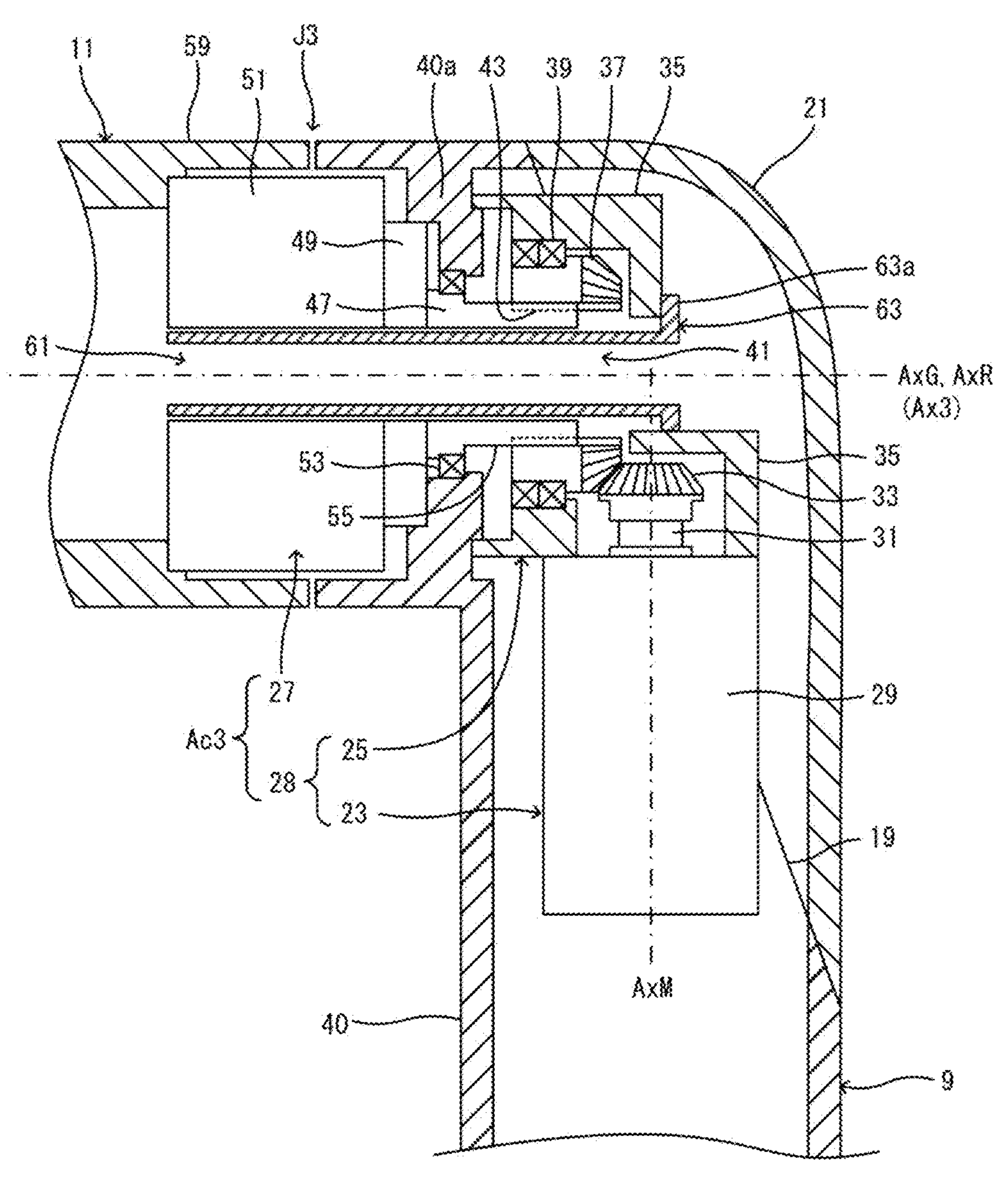

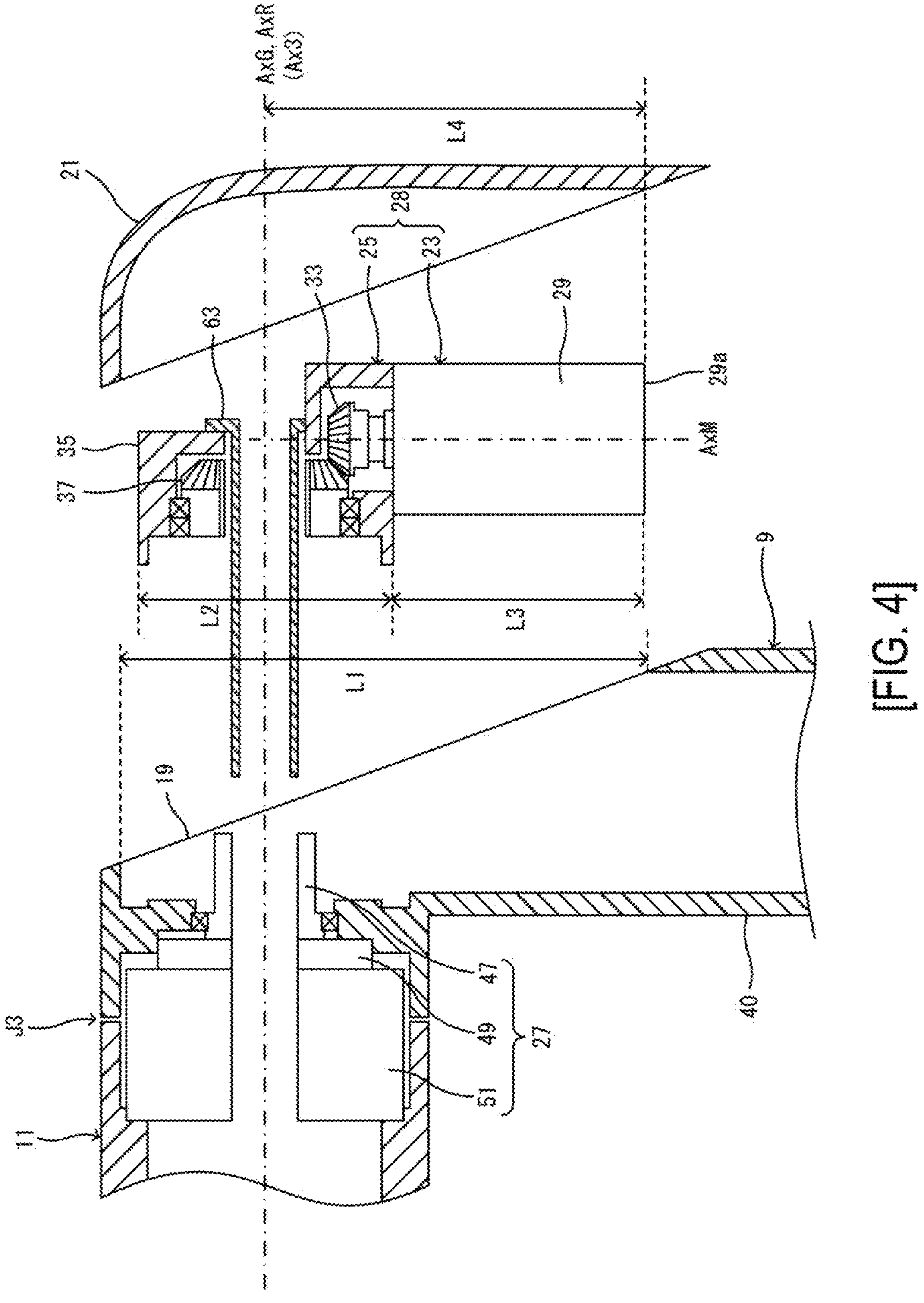
[FIG. 4]

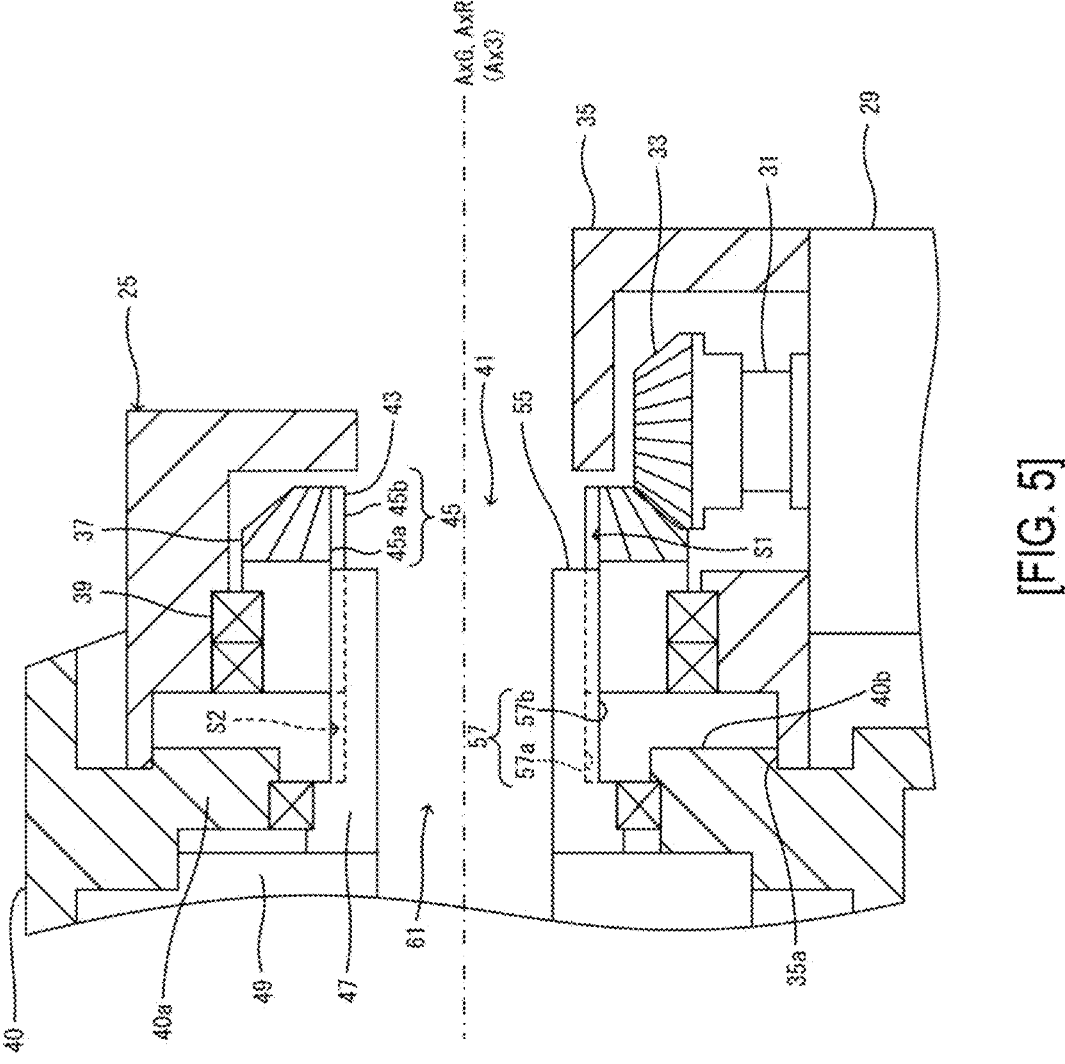
[FIG. 5]

[FIG. 6]
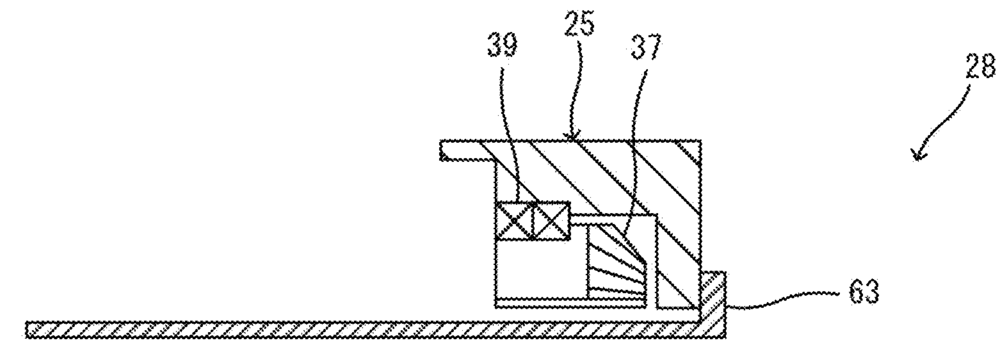
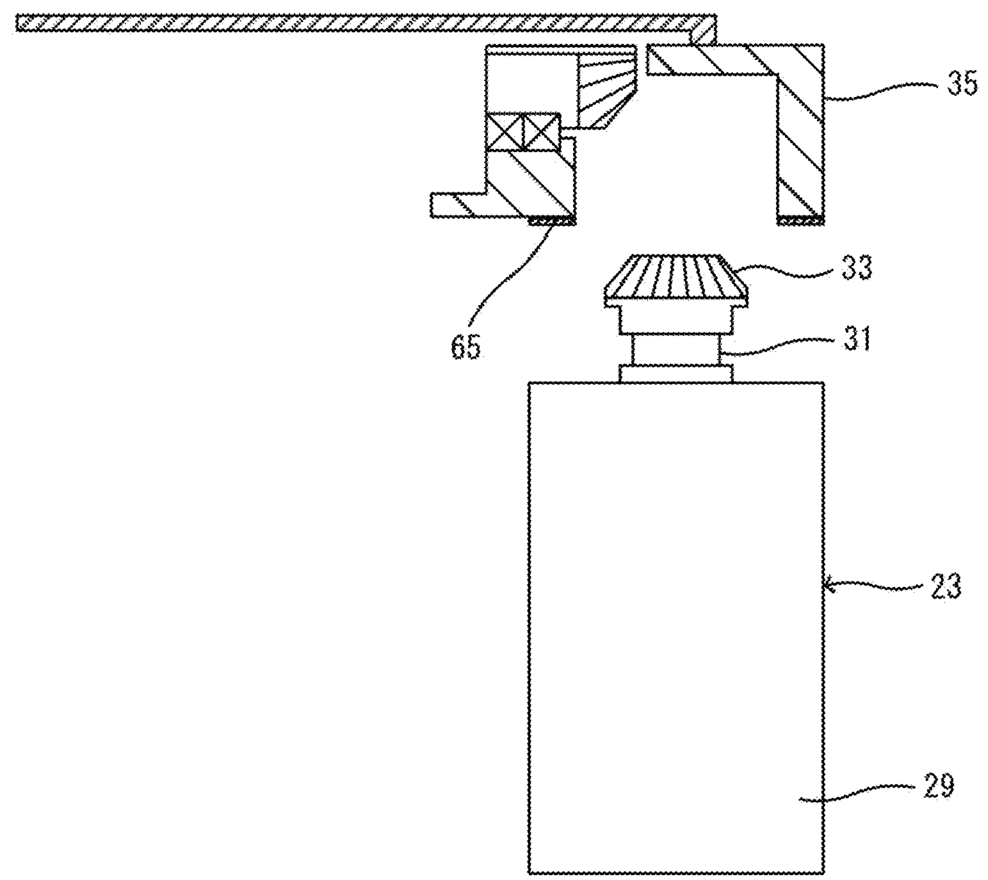

ROBOT AND METHOD FOR MANUFACTURING ROBOT

TECHNICAL FIELD

Embodiments of the disclosure relate to a robot and a method for manufacturing the robot.

BACKGROUND ART

For example, Patent Literature 1 describes a joint structure of a robot. The joint structure of this robot includes a hollow first member, a second member, and an actuator that causes the first member and the second member to rotate relative to each other around a first axis. The actuator includes a motor, a decelerator, and a power transmission mechanism. The decelerator is supported around a hollow hole and the first axis, and includes an input member for power of the power transmission mechanism. The power transmission mechanism includes an output member supported around a second axis. A housing is provided that houses a first power transmission portion, and a second power transmission portion that transmits power between a shaft supported around a third axis and the output member, and that supports the motor. The housing is detachably attached to the first member at a position offset to an outer side in a radial direction with respect to the hollow hole, and the power transmission mechanism and the input member are caused to be engaged with each other.

CITATION LIST

Patent Literature

Patent Document 1: JP 2021-94612 A

SUMMARY OF INVENTION

Technical Problem

In the related art described above, the housing that houses the second power transmission portion and supports the motor is attached at the position offset to the outer side in the radial direction with respect to the hollow hole of the decelerator. Thus, a distance, between the first axis of the decelerator and the end portion, of the motor, positioned on the opposite side to the first axis is increased, which leads to an increase in the size of the first member.

In light of the foregoing problems, an object of the present invention is to provide a robot and a method for manufacturing the robot with which downsizing of an arm is possible.

Solution to Problem

In order to solve the foregoing problems, according to an aspect of the present invention, a robot is applied that includes a first arm, a second arm rotatably coupled to the first arm, a motor housed in the first arm and including a rotation shaft configured to rotate around a first axial center, a first gear coupled to the rotation shaft and configured to rotate around the first axial center, a second gear configured to rotate, in conjunction with the first gear, around a second axial center intersecting the first axial center, and a decelerator configured to decelerate rotation of an input shaft and transmit the decelerated rotation to an output shaft, the decelerator including the input shaft configured to rotate around the second axial center in conjunction with the second gear, and the output shaft coupled to the second arm.

Further, according to another aspect of the present invention, a method for manufacturing a robot including a first arm, and a second arm rotatably coupled to the first arm is applied. The method includes coupling a second gear to an input shaft of a decelerator to cause the second gear and the input shaft to rotate around a second axial center, the second gear being configured to rotate in conjunction with a first gear configured to rotate around a first axial center of a motor housed in the first arm, the first gear being coupled to a rotation shaft configured to rotate around the first axial center, and the decelerator being configured to decelerate rotation of the input shaft and transmit the decelerated rotation to an output shaft, the decelerator including the input shaft configured to rotate, in conjunction with the second gear, around the second axial center intersecting the first axial center, and the output shaft coupled to the second arm.

Advantageous Effects of Invention

According to the robot and the like of the present invention, it is possible to downsize an arm.

BRIEF DESCRIPTION OF DRAWINGS

FIG. 1 is a perspective view illustrating an example of a configuration of a robot according to an embodiment.

FIG. 2 is a perspective view illustrating an example of a state in which a cover of a lower arm portion of the robot is removed.

FIG. 3 is a cross-sectional view illustrating an example of a configuration of an actuator provided in a joint portion coupling the lower arm portion and an elbow portion.

FIG. 4 is a cross-sectional view illustrating an example of a state in which a gear unit is removed from a decelerator, in the actuator of the joint portion coupling the lower arm portion and the elbow portion.

FIG. 5 is an enlarged cross-sectional view of a coupling section between a second gear and an input shaft of the decelerator.

FIG. 6 is a cross-sectional view illustrating an example of a structure of the gear unit in a state in which a motor is removed from a gear box.

DESCRIPTION OF EMBODIMENTS

Embodiments will be described below with reference to the drawings.

1. Configuration of Robot

An example of a configuration of a robot according to an embodiment will be described with reference to FIG. 1. FIG. 1 is a perspective view illustrating an example of the configuration of the robot according to the embodiment.

As illustrated in FIG. 1, a robot 1 is configured, for example, as a vertical articulated six axis robot including six joint portions J1 to J6. An end effector (not illustrated) corresponding to work performed by the robot 1 is attached to a distal end portion 17*a* of the robot 1. The end effector is, for example, a robot hand or the like. The robot 1 may be a robot with axes other than the six axes (for example, five axes, seven axes, or the like). Further, the robot 1 may be a robot other than the vertical articulated robot, such as a horizontal articulated robot, a parallel link robot, or the like.

The robot 1 includes a base 3, a turning portion 5, and an arm 7. The base 3 is fixed to the floor or a stand, for example.

The turning portion 5 is supported by an upper end portion of the base 3 so as to be pivotable around a rotation axis Ax1 parallel to the vertical direction. The turning portion 5 is driven to pivot around the rotation axis Ax1 with respect to the upper end portion of the base 3 by driving of an actuator Ac1 (not illustrated) provided in the joint portion J1 that rotatably couples the base 3 and the turning portion 5 that are adjacent to each other.

The arm 7 is supported, for example, by a side portion on one side of the turning portion 5. The arm 7 includes a lower arm portion 9, an elbow portion 11, an upper arm portion 13, a wrist portion 15, and a flange portion 17.

The lower arm portion 9 is supported by the side portion on the one side of the turning portion 5 so as to be pivotable around a rotation axis Ax2 perpendicular to the rotation axis Ax1. The lower arm portion 9 is driven to pivot around the rotation axis Ax2 with respect to the side portion on the one side of the turning portion 5 by driving of an actuator Ac2 (not illustrated) provided in the joint portion J2 that rotatably couples the turning portion 5 and the lower arm portion 9 that are adjacent to each other.

The elbow portion 11 is supported by a distal end portion of the lower arm portion 9 so as to be pivotable around a rotation axis Ax3 parallel to the rotation axis Ax2. The elbow portion 11 is driven to pivot around the rotation axis Ax3 with respect to the distal end portion of the lower arm portion 9 by driving of an actuator Ac3 (see FIG. 2 to be described below) provided in the joint portion J3 that rotatably couples the lower arm portion 9 and the elbow portion 11 that are adjacent to each other.

The upper arm portion 13 is supported by a distal end portion of the elbow portion 11 so as to be rotatable about a rotation axis Ax4 perpendicular to the rotation axis Ax3. The upper arm portion 13 is driven to rotate around the rotation axis Ax4 with respect to the distal end portion of the elbow portion 11 by driving of an actuator Ac4 (not illustrated) provided in the joint portion J4 that rotatably couples the elbow portion 11 and the upper arm portion 13 that are adjacent to each other.

The wrist portion 15 is supported by a distal end portion of the upper arm portion 13 so as to be pivotable about a rotation axis Ax5 perpendicular to the rotation axis Ax4. The wrist portion 15 is driven to pivot around the rotation axis Ax5 with respect to the distal end portion of the upper arm portion 13 by driving of an actuator Ac5 (not illustrated) provided in the joint portion J5 that rotatably couples the upper arm portion 13 and the wrist portion 15 that are adjacent to each other.

The flange portion 17 is supported by a distal end portion of the wrist portion 15 so as to be rotatable around a rotation axis Ax6 perpendicular to the rotation axis Ax5. The flange portion 17 is driven to rotate around the rotation axis Ax6 with respect to the distal end portion of the wrist portion 15 by driving of an actuator Ac6 (not illustrated) provided in the joint portion J6 that rotatably couples the wrist portion 15 and the flange portion 17 that are adjacent to each other.

The end effector is attached to the distal end portion **17*a* of the flange portion 17 and rotates around the rotation axis Ax6 together with the rotation of the flange portion 17 around the rotation axis Ax6**.

The robot 1 having the above configuration is the six axis robot including the six joint portions J1 to J6 provided with the six actuators Ac1 to Ac6. Each of the actuators Ac1 to Ac6 that drive the joint portions J1 to J6 is configured by a motor, a decelerator, and the like, for example.

Note that, in the above description, the rotation around the rotation axes in the longitudinal direction (or the extending direction) of the arm 7 is referred to as "rotation", and the rotation around the rotation axes perpendicular to the longitudinal direction (or the extending direction) of the arm 7 is referred to as "pivoting", in order to distinguish between the two.

Note that the above-described configuration of the robot 1 is an example, and is not limited to the content described above. For example, a torque sensor may be provided in at least one of the actuators Ac1 to Ac6, or a force sensor may be provided in the robot 1. In this case, when the robot 1 receives an external force due to collision with a person or an object, for example, it is possible to immediately stop the operation, avoid the external force in a direction opposite to the direction in which the external force acts, or the like, and the robot 1 can thus be configured as a human-collaborative robot capable of operating together with an operator.

2. Configuration of Actuator of Joint Portion

Next, an example of the configuration of the actuator Ac3 provided in the joint portion J3 will be described with reference to FIGS. 2 to 6. FIG. 2 is a perspective view illustrating an example of a state in which a cover of the lower arm portion 9 of the robot 1 is removed, FIG. 3 is a cross-sectional view illustrating an example of a configuration of the actuator Ac3 provided in the joint portion J3, FIG. 4 is a cross-sectional view illustrating an example of a state in which a gear unit is removed from the decelerator, in the actuator Ac3, FIG. 5 is an enlarged cross-sectional view of a coupling section between a second gear and an input shaft of the decelerator of the actuator Ac3, and FIG. 6 is a cross-sectional view illustrating an example of a structure of the gear unit in a state in which the motor is removed from a gear box.

As described above, the lower arm portion 9 (an example of a first arm) and the flange portion 11 (an example of a second arm) are coupled to each other by the joint portion J3 so as to be rotatable around the rotation axis Ax3. As illustrated in FIG. 2, the lower arm portion 9 has an opening 19 provided in the vicinity of the distal end portion, and a cover 21 for closing the opening 19. The cover 21 is fixed to the opening 19 by a plurality of bolts (not illustrated), for example. As illustrated in FIG. 2, in the state in which the cover 21 is removed, the actuator Ac3 provided in the joint portion J3 is exposed.

FIG. 3 illustrates an example of the configuration of the actuator Ac3. As illustrated in FIG. 3, the actuator Ac3 includes a motor 23, a gear box 25, and a decelerator 27.

The motor 23 is housed in the lower arm portion 9. The motor 23 includes a motor housing 29 that houses a rotor, a stator, and the like, a motor shaft 31 (an example of a rotation shaft) that protrudes from the motor housing 29 and rotates around a motor axial center AxM (an example of a first axial center), and a first gear 33 that is coupled to the motor shaft 31 and rotates around the motor axial center AxM. Although not illustrated, the motor 23 includes an encoder, a brake device, and the like.

The gear box 25 includes a housing 35 (an example of a housing), a second gear 37, and a bearing 39. The housing 35 is a box-shaped member, houses the second gear 37, and rotatably supports the second gear 37 using the bearing 39. The bearing 39 is attached to the housing 35 in a state in which an appropriate pressure is applied, so as to support both a force in a radial direction and a force in a thrust direction acting on the second gear 37. The motor housing 29 is detachably coupled to one end (the lower end in FIG. 3) of the housing 35 by a bolt or the like, for example. A gear unit 28 is configured by coupling the motor 23 to the gear box 25. The other end (the left end in FIG. 3) of the housing 35 is detachably coupled to a support portion 40*a* of a housing 40 of the lower arm portion 9 by a bolt or the like, for example. That is, the gear unit 28 is attachable to and detachable from the housing 40 of the lower arm portion 9.

The second gear 37 rotates around a gear axial center AxG (an example of a second axial center), in conjunction with the first gear 33 of the motor 23. The gear axial center AxG substantially coincides with the rotation axis Ax3. The first gear 33 and the second gear 37 are configured as bevel gears, for example. The first gear 33, which is a driving bevel gear, and the second gear 37, which is a driven bevel gear, mesh with each other, and the motor axial center AxM and the gear axial center AxG intersect each other at an angle of approximately 90 degrees, for example. "Intersect" in this case means that the motor axial center AxM and the gear axial center AxG are on the same plane and intersect each other. The motor axial center AxM and the gear axial center AxG may intersect each other at an angle other than 90 degrees.

Note that the first gear 33 and the second gear 37 may have a configuration other than the bevel gear, as long as the axial centers thereof intersect each other and rotate in conjunction with each other. For example, the first gear and the second gear may be configured as hypoid gears. "Intersect" in this context means that the motor axial center AxM and the gear axial center AxG are located on different planes to be offset from each other and at positions twisted with respect to each other to not cross at a point. Further, the first gear 33 and the second gear 37 need not necessarily be configured to mesh directly with each other, as long as they are configured to rotate in conjunction with each other. For example, a configuration may be adopted in which a power transmission mechanism, such as another gear or the like, is interposed therebetween.

The second gear 37 is formed in a cylindrical shape and internally includes a cylindrical hollow portion 41 (an example of a first hollow portion) extending along the gear axial center AxG. Further, the second gear 37 has a hole portion 43 into which a shaft portion 55 of the decelerator 27 to be described later is inserted. An uneven portion 45 is provided on an inner periphery of the hole portion 43, extending along the gear axial center AxG. The uneven portion 45 will be described later. The hollow portion 41 is a space inside the hole portion 43.

The decelerator 27 includes an input shaft 47, a fixing portion 49, and an output shaft 51, decelerates the rotation of the input shaft 47, and transmits the decelerated rotation to the output shaft 51. The fixing portion 49 is fixed to the support portion 40*a* of the housing 40 of the lower arm portion 9. The input shaft 47 is supported by a bearing 53 so as to be rotatable with respect to the support portion 40*a* of the housing 40 of the lower arm portion 9, and rotates around a decelerator axial center AxR (an example of a second axial center) in conjunction with the rotation of the second gear 37. The decelerator axial center AxR substantially coincides with the gear axial center AxG and the rotation axis Ax3. The bearing 53 is attached to the support portion 40*a* in a state in which an appropriate pressure is applied, so as to support both a force in a radial direction and a force in a thrust direction acting on the input shaft 47.

The input shaft 47 includes the shaft portion 55 that is inserted into the hole portion 43 of the second gear 37. An uneven portion 57 is provided on an outer periphery of the shaft portion 55, extending along the decelerator axial center AxR. The uneven portion 57 will be described later. The second gear 37 and the input shaft 47 are coupled to each other by so-called spline coupling in which the uneven portion 45 provided on the inner periphery of the hole portion 43 and the uneven portion 57 provided on the outer periphery of the shaft portion 55 are fitted to each other.

Note that the second gear 37 and the input shaft 47 may be coupled to each other by a configuration other than the spline coupling, as long as the configuration is capable of transmitting force in the rotation direction and releasing force in the thrust direction. For example, the coupling may be performed by forming a key groove in either the shaft portion or the hole portion, or the shaft portion and the hole portion may be coupled together as a polygonal shape. Further, the second gear 37 and the input shaft 47 need not necessarily be configured to be directly coupled to each other, as long as they are configured to rotate in conjunction with each other around the same axial center. For example, a configuration may be adopted in which a power transmission mechanism, such as another gear, is interposed therebetween.

The output shaft 51 rotates around the decelerator axial center AxR (that is, the rotation axis Ax3) with respect to the fixing portion 49. The output shaft 51 is fixed to a housing 59 of the elbow portion 11.

The input shaft 47, the fixing portion 49, and the output shaft 51 include a cylindrical hollow portion 61 (an example of a second hollow portion) extending along the decelerator axial center AxR. The hollow portion 41 of the second gear 37 and the hollow portion 61 of the decelerator 27 are communicated with each other in the direction of the decelerator axial center AxR in a state in which the second gear 37 and the input shaft 47 are coupled to each other. A cylindrical tubular member 63 is inserted into the communicating hollow portion 41 and hollow portion 61. A gap is provided between the outer peripheral surface of the tubular member 63 and the inner peripheral surface of the hollow portion 41 of the second gear 37, and between the outer peripheral surface of the tubular member 63 and the inner peripheral surface of the hollow portion 61 of the decelerator 27. The tubular member 63 includes a flange portion 63*a* at one end, and the flange portion 63*a* is detachably coupled to the housing 35 by a bolt or the like, for example.

FIG. 4 illustrates a state in which the cover 21 is removed from the housing 40 of the lower arm portion 9, and the gear unit 28 is removed via the opening 19. As illustrated in FIG. 4, a dimension L1 of the opening 19 in the direction of the motor axial center AxM is greater than the sum of a dimension L2 of the housing 35 of the gear box 25 in the direction of the motor axial center AxM and a dimension L3 of the motor housing 29 of the motor 23, coupled to the housing 35, in the direction of the motor axial center AxM. That is, the dimension L1 is greater than the dimension (L2+L3) of the gear unit 28 in the direction of the motor axial center AxM. Thus, as illustrated in FIGS. 2 and 4, when the cover 21 is removed, an entire region including the entire length of the gear unit 28 in the direction of the motor axial center AxM is exposed to the side opposite to the decelerator 27.

FIG. 5 is an enlarged view of the coupling section between the second gear 37 and the input shaft 47. Note that the tubular member 63 is not illustrated in FIG. 5. As illustrated in FIG. 5, the uneven portion 45 (an example of a second uneven portion) is provided on the inner periphery of the hole portion 43 of the second gear 37, extending along the gear axial center AxG. The uneven portion 45 includes a plurality of groove-shaped concave portions 45*a* extending substantially parallel to the gear axial center AxG, and a plurality of linear convex portions 45*b* extending substantially parallel to the gear axial center AxG. The concave portions 45*a* and the convex portions 45*b* are alternately arranged in the peripheral direction on the inner periphery of the hole portion 43. Note that the uneven portion 45 includes a configuration in which only one of the concave portions 45*a* or the convex portions 45*b* are provided. Further, a number of each of the concave portions 45*a* or the convex portions 45*b* is not limited to the plurality thereof, and includes a configuration in which only one of each thereof is provided.

Further, the uneven portion 57 (an example of a first uneven portion) is provided on the outer periphery of the shaft portion 55 of the input shaft 47, extending along the decelerator axial center AxR. The uneven portion 57 includes a plurality of groove-shaped concave portions 57*a* extending substantially parallel to the decelerator axial center AxR, and a plurality of linear convex portions 57*b* extending substantially parallel to the decelerator axial center AxR. The concave portion 57*a* of the shaft portion 55 is fitted to the convex portion 45*b* of the hole portion 43, and the convex portion 57*b* of the shaft portion 55 is fitted to the concave portion 45*a* of the hole portion 43. The concave portions 57*a* and the convex portions 57*b* are alternately arranged in the peripheral direction on the outer periphery of the shaft portion 55. Note that the uneven portion 57 includes a configuration in which only one of the concave portions 57*a* or the convex portions 57*b* are provided. Further, a number of each of the concave portions 57*a* or the convex portions 57*b* is not limited to the plurality thereof, and includes a configuration in which only one of each thereof is provided.

In a state in which the uneven portion 45 of the hole portion 43 and the uneven portion 57 of the shaft portion 55 are fitted to each other so that the second gear 37 and the input shaft 47 are coupled to each other, the hole portion 43 of the second gear 37 includes a space S1, in the uneven portion 45, in which the uneven portion 57 of the shaft portion 55 can move toward the distal end side (the right side in FIG. 5) of the shaft portion 55, along the direction of the gear axial center AxG. In other words, the space S1 includes a space, of the concave portion 45*a*, to which the convex portion 57*b* is not fitted. Further, in the state in which the uneven portion 45 of the hole portion 43 and the uneven portion 57 of the shaft portion 55 are fitted to each other so that the second gear 37 and the input shaft 47 are coupled to each other, the shaft portion 55 of the input shaft 47 includes a space S2, in the uneven portion 57, in which the uneven portion 45 can move toward the base end side (the left side in FIG. 5) of the shaft portion 55 along the direction of the decelerator axial center AxR. In other words, the space S2 includes a space, of the concave portion 57*a*, to which the convex portion 45*b* is not fitted. In this way, the shaft portion 55 and the hole portion 43 can be allowed to move relative to each other in the direction of the gear axial center AxG (the decelerator axial center AxR). Thus, it is possible to prevent the force in the thrust direction generated in the second gear 37 from being transmitted to the input shaft 47 of the decelerator 27, and prevent the force in the thrust direction generated in the input shaft 47 of the decelerator 27 from being transmitted to the second gear 37.

Further, as illustrated in FIG. 5, for example, a ring-shaped protrusion portion 40*b* is formed on the support portion 40*a* of the housing 40 of the lower arm portion 9, and the housing 35 of the gear box 25 has an opening 35*a* having a shape (a circular shape, for example) corresponding to the outer periphery of the protrusion portion 40*b*. The gear box 25 is positioned such that the gear axial center AxG of the second gear 37 and the decelerator axial center AxR of the input shaft 47 substantially coincide with each other by fitting the opening 35*a* with the protrusion portion 40*b*. Further, the position of the gear box 25 in the direction of the gear axial center AxG (the direction of the decelerator axial center AxR) is determined by the distal end portion of the opening 35*a* abutting against the end surface of the support portion 40*a* of the housing 40.

FIG. 6 illustrates the gear unit 28 in the state in which the motor 23 is removed from the gear box 25. As described above, since the first gear 33 and the second gear 37 are configured as the bevel gears, it is necessary to adjust the meshing between the first gear 33 and the second gear 37. In the present embodiment, as illustrated in FIG. 6, the meshing between the first gear 33 and the second gear 37 is adjusted in the state in which the gear unit 28 is removed from the housing 40 of the lower arm portion 9. Specifically, the meshing between the first gear 33 and the second gear 37 is adjusted by removing the motor 23 from the gear box 25 and changing the thickness of a shim 65 interposed between the motor housing 29 and the housing 35. Note that a shim may be provided between the first gear 33 and the motor shaft 31. Note also that the adjustment of the meshing may be performed in a state in which the tubular member 63 is attached to the housing 35, or may be performed in a state in which the tubular member 63 is removed from the housing 35.

A method for manufacturing the robot 1 having the above-described configuration includes coupling the second gear 37 to the input shaft 47 of the decelerator 27 to cause the second gear 37 and the input shaft 47 to rotate around the common axial centers AxG and AxR, wherein the second gear 37 rotates in conjunction with a first gear 33 that is coupled to the motor shaft 31 of the motor 23 housed in the lower arm portion 9 and rotates around the motor axial center AxM, the decelerator 27 decelerates the rotation of the input shaft 47 and transmits the decelerated rotation to an output shaft 51, the decelerator 27 including the input shaft 47 that rotates, in conjunction with the second gear 37, around the decelerator axial center AxR intersecting the motor axial center AxM, and includes the output shaft 51 coupled to the elbow portion 11.

3. Effects of Embodiment

As described above, in the robot 1 according to the present embodiment, the rotation of the motor shaft 31 by the motor 23 housed in the lower arm portion 9 is transmitted to the input shaft 47 of the decelerator 27 via the first gear 33 and the second gear 37, and the rotation of the input shaft 47 is decelerated and transmitted to the output shaft 51 coupled to the elbow portion 11, so that the elbow portion 11 rotates with respect to the lower arm portion 9. According to the present embodiment, the second gear 37 and the input shaft 47 of the decelerator 27 rotate around the common axial centers AxG and AxR (the gear axial center AxG and the decelerator axial center AxR) intersecting the motor axial center AxM. Accordingly, it is possible to reduce a distance L4 (see FIG. 4) between the axial centers AxG and AxR and an end portion 29*a* of the motor 23 located on the side opposite to the axial centers AxG and AxR. Thus, it is possible to downsize the lower arm portion 9 housing the motor 23.

Further, in the present embodiment, the robot 1 may include the housing 35 which rotatably supports the second gear 37 and to which the motor 23 is coupled, and the housing 35 may be configured to be attachable to and detachable from the lower arm portion 9. In this case, by coupling the motor 23 including the first gear 33 to the housing 35, the first gear 33, the second gear 37, and the motor 23 can be unitized. In this way, since the meshing between the first gear 33 and the second gear 37 can be adjusted in the state in which the gear unit 28 is removed from the lower arm portion 9, an adjustment operation becomes easy, and assemblability can be improved.

Further, in the present embodiment, the input shaft 47 of the decelerator 27 may include the shaft portion 55 that includes, on the outer periphery thereof, the uneven portion 57 extending along the decelerator axial center AxR, and the second gear 37 may include the hole portion 43, into which the shaft portion 55 is inserted, the hole portion 43 including, on the inner periphery thereof, the uneven portion 45 extending along the gear axial center AxG and fitting with the uneven portion 57. In this case, the second gear 37 and the input shaft 47 can be coupled to each other by the so-called spline coupling in which the uneven portion 57 provided on the outer periphery of the shaft portion 55 is fitted to the uneven portion 45 provided on the inner periphery of the hole portion 43. In this way, for example, compared to a case of coupling via a gear, the meshing adjustment operation becomes unnecessary, a coupling operation becomes easy, and assemblability can be improved. Further, noise can be reduced compared to the case of coupling via a gear.

Further, in the present embodiment, the shaft portion 55 may include, in the uneven portion 57, the space S2 in which the uneven portion 45 of the second gear 37 can move toward the base end side of the shaft portion 55 along the direction of the decelerator axial center AxR. The hole portion 43 may include, in the uneven portion 45, the space S1 in which the uneven portion 57 can move toward the distal end side of the shaft portion 55 along the direction of the gear axial center AxG. In this case, the space S1 of the uneven portion 45 and the space S2 of the uneven portion 57 allow the shaft portion 55 and the hole portion 43 to move relative to each other in the direction of the axial centers AxG and AxR, in the state in which the second gear 37 and the input shaft 47 are coupled to each other. Thus, it is possible to prevent the force in the thrust direction generated in the second gear 37 from being transmitted to the input shaft 47 of the decelerator 27, and prevent the force in the thrust direction generated in the input shaft 47 of the decelerator 27 from being transmitted to the second gear 37. Thus, the second gear 37 and the input shaft 47 can be coupled to each other so as to release the force in the thrust direction while transmitting a force in the rotational direction.

Further, in the present embodiment, the second gear 37 may include the hollow portion 41 extending along the gear axial center AxG, and the input shaft 47, the fixing portion 49, and the output shaft 51 may include the hollow portion 61 extending along the decelerator axial center AxR. The hollow portion 41 and the hollow portion 61 may be communicated with each other in the direction of the axial centers AxG and AxR in the state in which the second gear 37 and the input shaft 47 are coupled to each other. In this case, a cable can be inserted into the communicated hollow portion 41 and hollow portion 61. Accordingly, a cable can be wired between the inside of the lower arm portion 9 and the inside of the elbow portion 11 through the gear box 25 and the decelerator 27.

Further, in the present embodiment, the robot 1 may include the tubular member 63 inserted into the hollow portion 41 and the hollow portion 61 which are communicated with each other in the direction of the axial centers AxG and AxR. In this case, since it is possible to prevent the cable wired inside the hollow portion 41 and the hollow portion 61 from rubbing against the second gear 37, the input shaft 47, and the like which are rotating members around the cable, it is possible to protect the cable. Further, it is possible to prevent grease of the gear box 25 and the decelerator 27 from leaking into the hollow portions 41 and 61 in which the cable is wired.

Further, in the present embodiment, the tubular member 63 may be configured to be attachable to and detachable from the housing 35 of the gear box 25. In this case, since the tubular member 63 can be removed when the meshing between the first gear 33 and the second gear 37 is adjusted in the gear unit 28, the adjustment operation becomes easy. Further, when the gear unit 28 is coupled to the input shaft 47 of the decelerator 27, it is possible to perform the coupling in a state in which the tubular member 63 is attached to the gear unit 28, or it is possible to perform the coupling in a state in which the tubular member 63 is removed from the gear unit 28, and the tubular member 63 is attached to the gear unit 28 after the coupling. Thus, a degree of freedom of the assembly operation can be improved. In particular, when the tubular member 63 is removed from the gear unit 28, the relative position between the hole 43 of the second gear 37 and the shaft portion 55 of the input shaft 47 of the decelerator 27 can be visually recognized through the hollow portion 41 when the gear unit 28 is assembled to the decelerator 27, and thus the assemblability can be improved.

Further, in the present embodiment, the lower arm portion 9 may include the opening 19 whose dimension L1 in the direction of the motor axial center AxM is greater than the sum of the dimension L2 of the housing 35 and the dimension L3 of the motor 23 coupled to the housing 35, and may include the cover 21 that closes the opening 19. In this case, since the dimension L1 of the opening 19 is greater than the dimension (L2+L3) of the gear unit 28, the work of attaching or detaching the gear unit 28 to or from the decelerator 27 via the opening 19 becomes easy, and the assemblability can be improved. Further, as well as being possible to protect the gear unit 28 by closing the opening 19 with the cover 21 after the gear unit 28 is attached, it is also possible to suppress a deterioration in the external appearance of the robot 1 and in the strength of the lower arm portion 9.

Further, in the present embodiment, the opening 19 may be provided such that the housing 35 and the entire motor 23 coupled to the housing 35 are exposed on the side opposite to the decelerator 27 in the direction of the axial centers AxG and AxR, in the state in which the second gear 37 and the input shaft 47 are coupled to each other. In this case, since the opening 19 is provided so as to expose the entire gear unit 28, the work of attaching and detaching the gear unit 28 to and from the decelerator 27 via the opening 19 becomes easy, and the assemblability can be improved. Further, since the gear unit 28 can be attached to or detached from the decelerator 27 by moving the gear unit 28 in the direction of the axial centers AxG and AxR through the opening 19, automation of the attachment or detachment of the gear unit 28 becomes easy.

4. Modified Examples

The embodiment of the present disclosure is not limited to the above, and various modifications are possible without departing from the spirit and technical ideas of the present disclosure.

In the above description, the configuration of the above-described embodiment is applied to the actuator Ac3 provided in the joint portion J3 that rotatably couples the lower arm portion 9 and the elbow portion 11, of the arm 7 of the robot 1. However, the application location is not limited to the actuator Ac3. The configuration of the above-described embodiment may be applied, for example, to the actuator Ac2 of the joint portion J2 that rotatably couples the turning portion 5 and the lower arm portion 9, or may be applied to the actuator Ac5 of the joint portion J5 that rotatably couples the upper arm portion 13 and the wrist portion 15. That is, the configuration of the above-described embodiment is suitable for an actuator of a joint portion that pivots around a rotation axis perpendicular to the longitudinal direction (or the extending direction) of the arm 7.

For example, although the case is described, in the above-described embodiment, in which the second gear 37 includes the hole portion 43 and the input shaft 47 includes the shaft portion 55, a configuration may be adopted in which the second gear 37 includes a shaft portion and the input shaft 47 includes a hole portion into which the shaft portion of the second gear 37 is inserted.

For example, although the case is described, in the above-described embodiment, in which the first gear 33, the second gear 37, and the motor 23 are unitized, the first gear 33, the second gear 37, and the motor 23 need not necessarily be unitized as long as the second gear 37 and the input shaft 47 are configured to rotate about a common axial center.

In the above description, when "perpendicular", "parallel", "planar", and the like are used, the meanings are not construed strictly. That is, "perpendicular", "parallel", and "planar" mean "substantially perpendicular", "substantially parallel", and "substantially planar", respectively, with allowance for design and manufacturing tolerances and errors.

In the above description, when "the same", "identical", "equal", "different" and the like are used in reference to the external dimensions and sizes, shapes, positions, or the like, the meanings are not construed strictly. That is, "the same", "identical", "equal", and "different" mean "substantially the same", "substantially identical", "substantially equal", and "substantially different", respectively, with allowance for design and manufacturing tolerances and errors.

In addition to what has already been described above, the techniques according to the embodiment and the modified examples may be used in combination as appropriate. Also, while examples are not described, various modifications may be made to the above-described embodiments or modified examples within a range that does not depart from the technical scope thereof.

The problems to be solved by the above-described embodiment and modified examples and effects are not limited to the contents described above. The embodiment, the modified examples, or the like may solve a problem not described above or produce an effect not described above, or may solve only some of the described problems or produce only some of the described effects.

REFERENCE SIGNS LIST

1 Robot
9 Lower arm portion (example of first arm)
11 Elbow portion (example of second arm)
19 Opening
21 Cover
23 Motor
25 Gear box
27 Decelerator
28 Gear unit
29 Motor housing
29 Motor
31 Motor shaft (example of rotation shaft)
33 First gear
35 Housing (example of housing)
37 Second gear
41 Hollow portion (example of first hollow portion)
43 Hole portion
45 Uneven portion (example of second uneven portion)
47 Input shaft
51 Output shaft
55 Shaft portion
57 Uneven portion (example of first uneven portion)
61 Hollow portion (example of second hollow portion)
63 Tubular member
65 Shim
Ax3 Rotation axis (example of second axial center)
AxG Gear axial center (example of second axial center)
AxM Motor axial center (example of first axial center)
AxR Decelerator axial center (example of second axial center)
L1 Dimension
L2 Dimension
L3 Dimension
S1 Space
S2 Space

The invention claimed is:

1. A robot comprising:
a first arm;
a second arm rotatably coupled to the first arm;
a motor housed in the first arm and including a rotation shaft configured to rotate around a first axial center;
a first gear coupled to the rotation shaft and configured to rotate around the first axial center;
a second gear configured to rotate, in conjunction with the first gear, around a second axial center intersecting the first axial center;
a housing rotatably supporting the second gear and coupled to the motor;
a tubular member configured to attach to and detach from the housing; and
a decelerator configured to decelerate rotation of an input shaft and transmit the decelerated rotation to an output shaft, wherein
the decelerator includes:
the input shaft configured to rotate around the second axial center in conjunction with the second gear; and
the output shaft coupled to the second arm,
the second gear includes a first hollow portion extending along the second axial center,
the input shaft includes a second hollow portion extending along the second axial center,
the first arm includes an opening and a cover configured to close the opening,
in a state where the second gear and the input shaft are coupled to each other:
the first hollow portion and the second hollow portion communicate with each other along the second axial center,
the tubular member is disposed inside the first hollow portion and the second hollow portion, and
the housing and an entirety of the motor are exposed through the opening on a side opposite to the decelerator along the second axial center, and
the tubular member includes a flange portion at one end of the tubular member that is nearer to the opening than the other end of the tubular member.

2. The robot according to claim 1, wherein
the housing is configured to attach to and detach from the first arm.

3. The robot according to claim 2, wherein one of the second gear and the input shaft includes a shaft portion including a first uneven portion on an outer periphery of the shaft portion and extending along the second axial center, the other of the second gear and the input shaft includes a hole portion into which the shaft portion is inserted, the hole portion includes a second uneven portion on an inner periphery of the hole portion, and the second uneven portion extends along the second axial center and is fitted with the first uneven portion.

4. The robot according to claim 3, wherein the shaft portion includes a first space at the first uneven portion, in the state where the second gear and the input shaft are coupled, the second uneven portion moves within the first space toward a base end side of the shaft portion along of the second axial center, the hole portion includes a second space at the second uneven portion, and in the state where the second gear and the input shaft are being coupled, the first uneven portion moves within the second space toward a distal end side of the shaft portion along the second axial center.

5. The robot according to claim 1, wherein a dimension of the opening along the first axial center is greater than a sum of a dimension of the housing along the first axial center and a dimension of the motor, along the first axial center.

6. A method for manufacturing a robot including a first arm and a second arm rotatably coupled to the first arm, the method comprising:

coupling a second gear to an input shaft of a decelerator to cause the second gear and the input shaft to rotate around a second axial center, wherein the second gear is configured to rotate in conjunction with a first gear configured to rotate around a first axial center of a motor housed in the first arm, the first gear is coupled to a rotation shaft configured to rotate around the first axial center, the decelerator is configured to decelerate rotation of the input shaft and transmit the decelerated rotation to an output shaft, and includes:

the input shaft configured to rotate, in conjunction with the second gear, around the second axial center intersecting the first axial center; and the output shaft coupled to the second arm; and inserting a tubular member into a first hollow portion and a second hollow portion, wherein tubular member is configured to attach to and detach from a housing that rotatably supports the second gear and is coupled to the motor, the second gear includes the first hollow portion extending along the second axial center, the input shaft includes the second hollow portion extending along the second axial center, the first arm includes an opening and a cover configured to close the opening, in a state where the second gear and the input shaft are coupled to each other:

the first hollow portion and the second hollow portion communicate with each other along the second axial center, and the housing and an entirety of the motor are exposed through the opening on a side opposite to the decelerator along the second axial center, and the tubular member includes a flange portion at one end of the tubular member that is nearer to the opening than the other end of the tubular member.

* * * * *